Aug. 28, 1956  A. F. SOUTHWICK  2,760,386
VARIABLE SPEED TRANSMISSION EMPLOYING V-PULLEYS AND BELTS
Filed Dec. 8, 1951  2 Sheets-Sheet 1
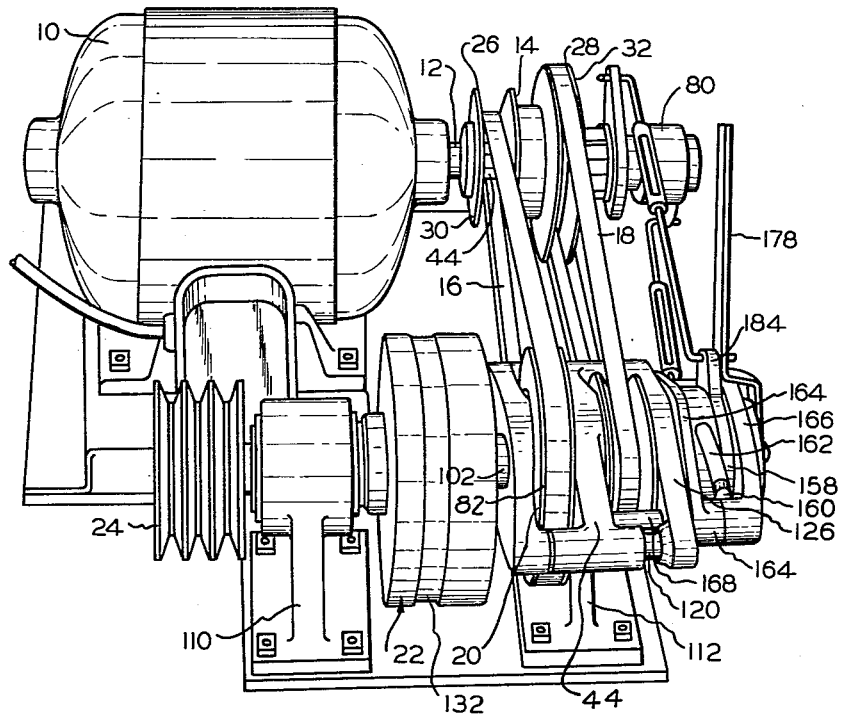
FIG. I.
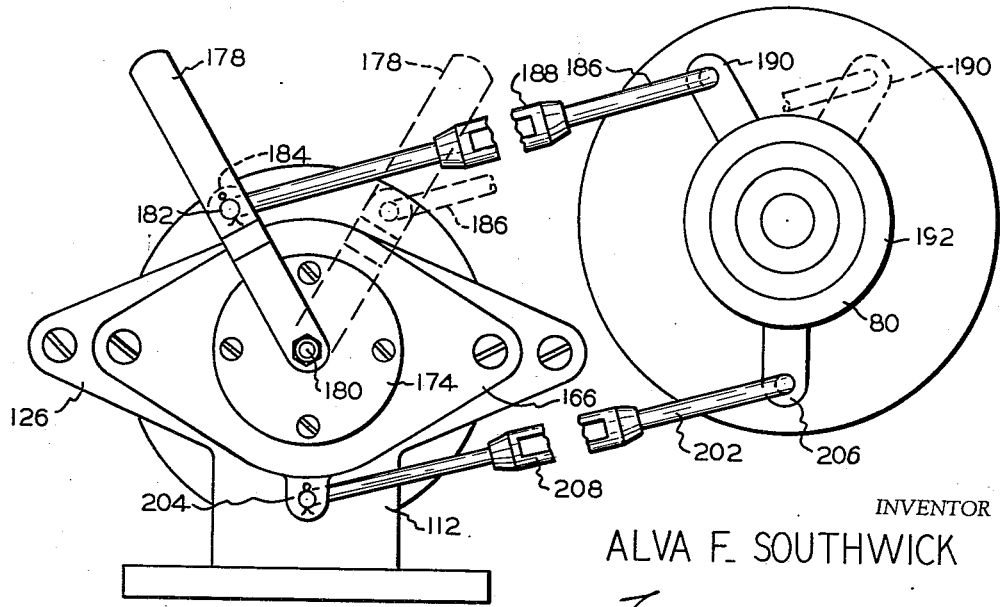
FIG. III.
INVENTOR
ALVA F. SOUTHWICK
BY Townsend F. Beaman
ATTORNEY Aug. 28, 1956 A. F. SOUTHWICK 2,760,386
VARIABLE SPEED TRANSMISSION EMPLOYING V-PULLEYS AND BELTS
Filed Dec. 8, 1951 2 Sheets-Sheet 2
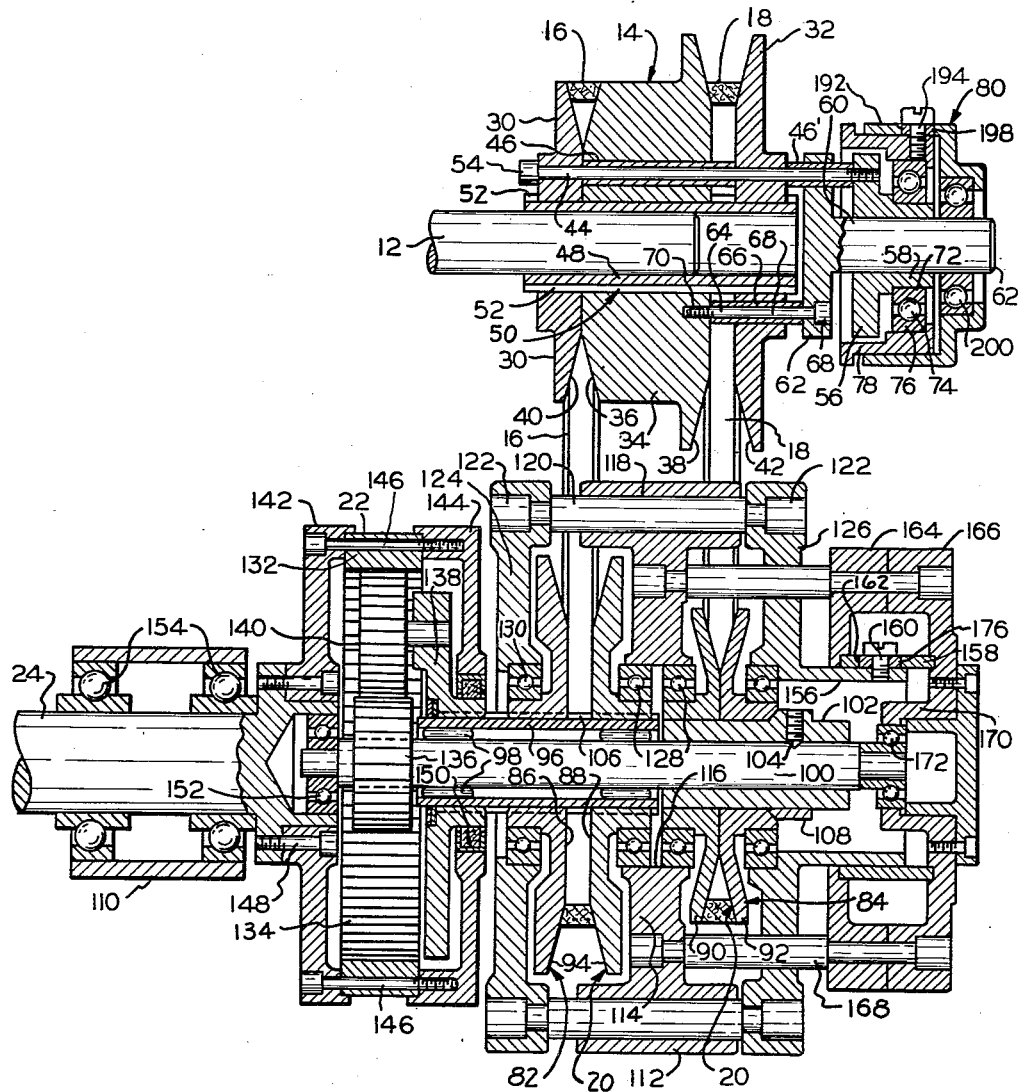
FIG. II.
INVENTOR
ALVA F. SOUTHWICK
BY Townsend & Beaman
ATTORNEY

United States Patent Office 2,760,386
Patented Aug. 28, 1956

2,760,386

VARIABLE SPEED TRANSMISSION EMPLOYING V-PULLEYS AND BELTS

Alva F. Southwick, Jackson, Mich.

Application December 8, 1951, Serial No. 260,595

4 Claims. (Cl. 74—722)

This invention relates to variable speed power transmitting mechanisms of the type which employ endless belts engaged with inversely variable diameter V-pulleys for producing an infinitely variable speed drive transmission.

The present application is a continuation in part of my prior application Serial Number 653,626 filed March 11, 1946, now abandoned.

It is an object of the present invention to provide an improved and compact transmission of the above kind in which the inverse variation of the effective pulley pitch diameters by an axial shifting of the pulleys is capable of being controlled in a simple and efficient manner, while at the same time the pulleys are axially aligned in compensating relation to the axial shifting of the pulleys, whereby to maintain the pulley belts in alignment and prevent any tendency for edgewise climbing thereof with respect to their V-section pulley grooves.

It is a further object of the invention to provide an infinitely variable belt and pulley transmission of the above kind in which the inverse adjustment of the effective pulley pitch diameters is capable of being effected in a simple and positive manner while at the same time permitting a self-aligning of the adjusted pulleys to take place to maintain the belts in alignment for all positions of axial adjustment of the pulleys.

Further objects and advantages of the invention, residing in the construction, arrangement and combination of parts will appear clear from a consideration of the one practical form of the invention, by way of example, with reference to the accompanying drawings and from the appended claims.

In the drawings:

Fig. I is a perspective plan view of a motor and transmission assembly in accordance with the invention, with the transmission pulleys in the position to give zero speed;

Fig. II is a sectional plan view of the transmission as seen in Fig. I with the pulleys adjusted, however, to give maximum speed; and Fig. III is an end elevational view of the inter-connected pulley adjusting actuator mechanisms as seen in Figs. I and II.

Referring to the drawings, 10 indicates a motor having a driving shaft 12 upon which there is mounted a pulley assembly, indicated generally at 14, which pulley assembly is connected by endless belts 16, 18, with a counterpart pulley assembly, indicated generally at 20, which pulley assembly 20 is mounted and connected, through a planetary gear set, indicated generally at 22, to drive a shaft 24, hereinafter referred to as the driven shaft.

The pulley assembly 14 comprises a pair of V-section pulleys 26 and 28 composed of separate outer pulley sections 30 and 32 and of a common central pulley section 34 defining on its opposite ends bevelled surfaces 36 and 38 forming with similar bevelled surfaces 40 and 42 on the separate pulley sections 30 and 32, the two V-section pulleys 26 and 28, with the one pulley 28 being permanently of larger effective diameter than its axially adjacent pulley 26.

The two outer pulley sections 30 and 32 are rigidly connected together in permanent axially spaced relationship by means of a series of tie bolts and spaced tubes 44 and 46, 46', respectively, and are thus mounted for both rotary movement with, and, axial movement upon, the motor and driving shaft 12, through the medium of a sleeve 48 and spline connection 50, the spline connection being provided by circumferentially spaced axial splines 52 on the exterior surface of the sleeve 48, and the sleeve itself being fast upon the driving shaft 12. The outer pulley sections 30 and 32 are splined on their inner peripheries for connection with the splines 52, as also is the interior periphery of the central pulley section 34. The construction and arrangement is such that all three pulley sections 30, 32 and 34 are constrained to rotate with the driving shaft 12 while at the same time both pulley sections 30 and 32 can move axially as a unit with respect to the shaft 12, with the central pulley section 34 being independently movable axially (under certain conditions, as will be described later) with respect to the shaft 12.

The tie bolts 44, having heads 53 at one end, are screwed at their opposite end 54 into a flange 56 integral with a sleeve 58 mounted upon an inner shaft 60 having an end flange 62 through which the tie bolts 44 and the spacer tubes 46' pass freely and which flange 62 is connected with the central pulley section 34 by means of further tie bolts 64 and spacer tubes 66, the tie bolts 64 having their headed ends 68 engaged in the flange 62 and being screwed at their opposite ends 70 into the central pulley section 34.

It will be appreciated that both the sleeve 58 and the shaft 60 are axially slidable with respect to one another as well as being rotatable with the driving shaft 12.

Fixedly mounted upon sleeve 58 is the inner race ring 72 of a ball bearing assembly 74, the outer race ring 76 of which is fixedly mounted upon a sleeve 78 which forms the axially slidable component of an actuator mechanism, indicated generally at 80 and described in detail later.

The pulley assembly 20 comprises a pair of V-section pulleys 82 and 84, each composed of separate pulley sections, with the separate such sections being indicated as 86, 88, 90 and 92 and each said section presenting a bevelled outer peripheral surface 94 defining the V-section of their respective pulleys 82 and 84.

The pulleys 82 and 84 form the counter-parts of the pulleys 26 and 28, respectively, with the pulleys 26 and 82 being inter-connected by the endless belt 16 and the pulleys 28 and 84 being inter-connected by the endless belt 18, both belts being of trapezoidal section for mating and driving engagement with their respective V-section pulleys.

It may be pointed out here that the pulleys 26 and 84 have the same pitch diameter, as also do the pulleys 28 and 82, but that the two sets of pulleys, as constituted by the pulleys 26 and 82 and the pulleys 28 and 84, have their effective pitch diameters variable inversely with respect to one another, as will be made clear later.

The pulley section 88 is mounted fast upon a sleeve 96 itself rotatably mounted, as by the needle bearings 98, upon a central shaft 100, while the pulley section 90 is mounted fast upon a sleeve 102 itself mounted fast upon the shaft 100, as by the set screw 104.

The sleeve 96 has external axial splines 106 by which both the pulley sections 88 and 86 are rotatably connected with the sleeve 96. The sleeve 102 also has external splines 108 by which both the pulley sections 92 and 90 are rotatably connected with the sleeve 102 and hence with the central shaft 100. Whereas, however, the inside pulley sections 88 and 90 of the two driven pulleys 82 and 84 are held against axial movement with respect to their rotary supporting sleeves 96 and 102, respectively, the outer pulley sections 86 and 92 of these two driven pulleys are axially movable with respect to their rotary supporting sleeves 96 and 102.

The shaft 100 is supported at one end, through the medium of the planetary gear set 22, by a pedestal bearing 110, and is further supported intermediate its ends upon another pedestal bearing 112.

The pedestal bearing 112 has a pair of axially fixed horizontal arm portions 114 extending from a central boss 116 and each having an elongated boss 118 in its outer end through which a pair of tie bolts 120 extend, these tie bolts having head nuts 122 at their opposite ends which secure a pair of axially slidable horizontal arms 124, 126 upon the tie bolts 120 for axial movement as a unit therewith.

The axially fixed pulley sections 88 and 90 are rotatably mounted with respect to the axially fixed pedestal arm 114 through the medium of the roller bearing assemblies 128. The axially movable pulley sections 86 and 92, on the other hand, are rotatably mounted with respect to their respective axially movable arms 124 and 126 through the medium of the roller bearing assemblies 130 which connect these pulley sections and arms, i. e. the pulley section 86 and arm 124 and the pulley section 92 and arm 126, for axial movement as units upon their respective splines 106 and 108, with the tie bolts 120 being free to reciprocate axially within the bosses 118 of the axially fixed pedestal arms 114.

The planetary gear set 22 comprises an outer gear ring 132 having internal gear teeth 134, a sun gear 136 fast upon the shaft 100 and a planet carrier 138 fast upon the sleeve 96 and carrying planet pinions 140 in mesh with the external gear ring 132 and with the sun gear 140.

The external gear 132 is fixedly connected with housing side sections 142, 144 by means of tie bolts 146, with the side section 142 being fixedly connected with the driven shaft 24 by means of the screw studs 148 and the side section 144 being rotatably mounted with respect to the planet carrier 138 through the medium of an oil seal assembly 150.

The shaft 100 is rotatably supported with respect to the driven shaft 24 through the medium of the ball bearing assembly 152 and the driven shaft 24 is rotatably mounted within the fixed pedestal bearing 110 through the medium of the ball bearing assemblies 154.

The one arm 126 has an inner sleeve extension 156 which constitutes the axially movable component of a further actuator mechanism, which mechanism includes a rotatable ring element 158 connected with the sleeve part 156 by a pin 160 and inclined slot 162 and located against axial movement by being confined between axially fixed arms 164 and 166 tied to the axially fixed pedestal arm 114 by tie bolts 168. The one arm 166 has a central boss portion 170, with respect to which the shaft 100 is rotatably mounted by the ball bearing assembly 172. This arm 166 carries an end cover plate 174 for this bearing assembly 172.

The pin 160 is secured upon the sleeve extension 156 and engages in the inclined slot 162 through the medium of roller 176. Rotation of the ring 158, therefore, produces axial movement of the sleeve extension 156 and hence of the outside pulley sections 82 and 92 through the medium of the arms 124 and 126, united, as stated, by the tie bolts 120. This axial movement can take place in either direction by the actuation of a hand lever 178 mounted for oscillation at one end 180 upon the end cover 174 and connected intermediate its ends, as indicated at 182, to a radially projecting ear 184 fast upon the rotatable ring 158.

Referring now to the actuator mechanism 80, this is linked to the actuator hand lever 178 by means of the link 186, conveniently adjustable in length through the turnbuckle connection 188, this link being connected at one end to the ear 184, and, at its opposite end being connected to a corresponding ear 190 on the axially slidable sleeve 78 of the actuator mechanism 80. This actuator mechanism comprises also a pin and inclined slot connection between two relatively rotatable and axially movable parts constituted by the aforesaid sleeve 78 and by an outer sleeve member 192. The inner sleeve part 78 carries the pin 194, which engages in the inclined slot 196 in the outer sleeve part 192 through the medium of the roller 198.

The shaft 60 is rotatably mounted with respect to the outer sleeve part 192 through the medium of the ball bearing assembly 200.

It will be appreciated from the description thus far that whereas, with respect to the pulley assembly 20, only the outer pulley sections 82 and 92 are axially slidable and that the inside pulley sections 88 and 90 are always axially fixed, in the case of the other pulley assembly 14, all three pulley sections 30, 34 and 32 are capable of partaking of axial movement, with the two outside pulley sections 30 and 32 being movable axially together relatively to the central common pulley section 34 and all three pulley sections being capable of moving axially together as a unit with respect to the motor shaft 12, carrying with them the actuator mechanism 80. Such united axial movement is capable of being produced by sidewise pressure exerted against the pulley sections due to the initial actuation of the actuator devices to inversely adjust the effective pitch diameters of the different pulleys, it being appreciated that the inside pulley sections 88 and 90 are axially fixed so that the pulley belts 16 and 18 will tend to become misaligned as the effective pulley pitch diameters are varied, which mis-alignment, however, is capable of being immediately corrected by the resulting sidewise pressure of the pulley belts on the axially floatable pulley sections 30, 34 and 32 constraining these pulley sections, together with the actuator mechanism 80, to shift axially as a unit with respect to the motor shaft 12.

It is a requirement of the transmission that the axial adjustment of the various pulley sections shall take place in inverse sense. That is to state (a) the pulley sections 30 and 34 move apart to decrease their effective pitch diameter at the same time as the pulley sections 86 and 88 close together to increase their effective pitch diameter and (b) simultaneously therewith, the pulley sections 34 and 32 close together to increase their effective pitch diameter as the pulley sections 90 and 92 move apart to decrease their effective pitch diameter. Such adjustment is capable of being effected by the simple actuation of the hand lever 178 in one direction, or in the opposite direction, and by arranging that whereas the inclined slots 162 and 196 are inclined in the same direction their respective pins 160 and 194 are located, in their extreme positions, at opposite ends of their slots and travel in opposite directions in their respective slots.

The outer sleeve 192 and the arm 164 are inter-connected in non-rotary stabilized relationship by means of a link 202 connected at its ends to ears 204, 206 on the arm 164 and the sleeve 192, respectively, this link conveniently incorporating a turnbuckle 208 actuatable to adjust the effective length of the link to compensate for variations in the belt lengths.

The links 186 and 202 are so connected with the ears 184 and 204 as to be capable of partial pivotal movement with respect to the ears in vertical and horizontal planes, in the position as seen in Fig. I. Such pivotal movement is necessary to permit the entire pulley assembly 14, together with the actuator mechanism 80, to float axially as a unit with respect to the motor shaft 12 for the self-aligning of the pulley belts as well as to permit the united outside pulley sections 30 and 32 to be adjusted axially with respect to the central pulley section 34 and, further, to permit the outer sleeve part 192 to be partially rotated by the link 186 within the limits of the inclined slot 196.

In operation, to adjust the transmission from the zero speed condition as seen in Fig. I to the maximum speed condition as seen in Fig. II it is merely necessary to swing the hand lever 178 from the dotted line position as seen in Fig. III to the full line position. This causes the pin 160 to travel axially to the left in the inclined slot 162, as seen in Fig. I, as the ring 158 is rotated and thereby impart corresponding axial movement to the pulley sections 92 and 86 to cause the pulley section 92 to close upon its companion pulley section 90 as the pulley section 86 is moved apart with respect to its companion pulley section 88. This axial movement reverses the relative positions of these pulley sections to position them at maximum speed condition as seen in Fig. II compared with their zero speed position of Fig. I. At the same time, the link 186, by the arcuate movement of the hand lever 186, anti-clockwise, as seen in Fig. III, produces rotation of the sleeve 78 such that the pin 194 is constrained to move axially to the right by its engagement in the inclined slot 196. This movement of the sleeve 78 produces a corresponding unified axial movement of the pulley sections 30 and 32 to the right, from the position as seen in Fig. I, and with respect to the central pulley section 34, to the position as seen in Fig. II where the relative positions of these pulley sections with respect to one another is exactly reversed compared with the zero speed position thereof as seen in Fig. I.

Since the central pulley sections 88 and 90 are axially fixed it will be appreciated that the pulley belts 16 and 18 will tend to become mis-aligned as the pulleys are opened and closed and thereby cause the belts to tend to bind sideways in the pulleys 26 and 28, bearing in mind that the central pulley sections 88 and 90 are axially fixed so that the sideways binding of the belts becomes concentrated on the pulleys 26 and 28. The construction and mounting of these pulleys, however, and their associated actuator mechanism 80 is such, as above stated, that all can float axially with respect to the shaft 12. Accordingly, this sideways binding of the pulley belts on the pulleys 26 and 28 is resolved into an axial force which causes the pulleys and their associated actuator mechanism 80 to move axially with respect to the shaft 12 and thereby enable the belts to be maintained in alignment for the different adjusted positions of the pulley sections.

The pulley 86, 88 drives onto the planet carrier 138, whereas the pulley 90, 92 drives onto the sun gear 136. These two drives, which are of different speed values, due to the different pulley diameters, are absorbed by the outer gear ring 132 and transmitted to the driven shaft 24, the actual speed of rotation of which is therefore capable of being infinitely adjusted between the zero and maximum speed possibilities of the entire pulley and belt and planetary gear assembly by the operation of the actuator mechanisms as above described.

Having thus described my invention in reference to one practical embodiment thereof but without limitation to the precise details of construction therein involved, what I claim as novel and wish to secure by Letters Patent is as follows:

1. In a variable speed transmission, a first rotary shaft, separate axially adjacent half pulley sections on said shaft and rotatable therewith, adjacent pairs of said pulley sections defining different diameter V-section pulleys, means mounting said pulley sections for axial adjustment on said shaft, means connecting a pulley section of each pulley for united axial movement on said shaft, actuator means connected with said united pulley sections and operable to effect positive axial adjustment thereof, said actuator means being also axially adjustable with respect to said shaft together with all said pulley sections, a second rotatable shaft and a rotatable sleeve encircling said shaft, separate axially adjacent pulley sections on said second shaft and sleeve defining counter-part V-section pulleys for the pulleys on said first shaft, endless trapezoidal section belts inter-connecting said pulleys on the said first shaft with the pulleys on said second shaft and sleeve, actuator means connecting a pulley section of each pulley on said second shaft and sleeve for positive axial adjustment relatively to their companion pulley sections, said companion pulley sections being axially fixed on said second shaft and sleeve, and means inter-connecting said actuator maens on the two said shafts to effect adjustment of the effective pitch diameters of the pulleys in inverse relationship with respect to the adjacent pulleys on said drive shaft and said second shaft and sleeve.

2. In a variable speed transmission, a first rotary shaft, separate axially adjacent half pulley sections, means mounting said pulley sections on said shaft for rotation therewith, with adjacent pairs of said pulley sections defining a pair of different diameter V-section pulleys, means mounting said pulley sections for axial adjustment on said shaft, means connecting the outside pulley section of each pulley for united axial movement on said shaft relatively to their companion pulley sections, said companion pulley sections being defined on an intermediate member having pulley surfaces common to the adjacent pulley sections of their respective pulleys, actuator means connected with said united pulley sections and operable to effect positive axial adjustment thereof, said actuator means being also axially adjustable with respect to said shaft together with all said pulley sections, a second rotary shaft and a rotary sleeve encircling said second shaft, separate axially adjacent pulley sections on said second shaft and sleeve defining a pair of counter-part V-section pulleys for the pair of pulleys on said first shaft, endless trapezoidal section belts interconnecting said counter-part pulleys, further actuator means connecting the outside pulley section of each pulley on said second shaft and sleeve for positive axial adjustment relatively to their companion pulley sections, said companion pulley sections being axially fixed on said second shaft and sleeve, and means inter-connecting two actuator means to effect adjustment of the effective pitch diameters of the pulleys in inverse relationship with respect to the adjacent pulleys on said first shaft and said second shaft and sleeve.

3. In a variable speed transmission, a first rotary shaft, a pair of axially adjacent different diameter V-section pulleys on said shaft, said pulleys being defined by separate axially adjacent pulley sections having bevelled surfaces which combine to define the V-section pulleys, means mounting said pulley sections on said shaft for rotation therewith and permitting axial movement of said pulley sections with respect to said shaft, an actuator mechanism for producing positive axial adjustment of a pulley section of each pulley relatively to a companion pulley section, said mechanism including relatively rotatable parts and a connection between said parts constraining one part to shift axially with respect to said shaft as the other part is rotated, means connecting each said positively adjustable pulley section to said axially shiftable part, means connecting said companion pulley section with said actuator mechanism to permit all the said pulley sections and said mechanism to shift axially with respect to said shaft, a rotary shaft structure, a pair of axially adjacent different diameter V-section pulleys on said shaft structure, endless belts inter-connecting said pulleys on the said first shaft and on said shaft structure, said pulleys on said shaft structure being defined by separate axially adjacent pulley sections, means connecting the outside pulley sections on said shaft structure for axial movement relatively to said shaft structure, a second actuator mechanism, means connecting said second actuator mechanism with said outside pulley sections, said mechanism including relatively rotatable parts and means inter-connecting said parts to produce axial movement of one said part as the other part is rotated relatively thereto, said outside pulley sections being connected to move with said axially movable part, and means inter-connecting said actuator mechanisms to produce simultaneous actuation thereof as one said mechanism is actuated, said connection means between the relatively rotatable parts of each said actuator mechanisms being so constructed and arranged as to produce axial shifting of their corresponding pulley sections on the said first shaft and on said shaft structure in opposite directions so as to vary the effective pitch diameters of the pulleys in inverse relationship with respect to the adjacent pulleys on said first shaft and said shaft structure.

4. In a variable speed transmission, a drive shaft, a pair of V-section pulleys, means mounting said pulleys upon said shaft in axially adjacent relationship for rotation with said shaft, each said pulley including a separate half pulley section axially adjustable with respect to a third pulley section of said pair of pulleys to vary the effective pitch diameter of said pair of pulleys, means rigidly connecting said half pulley sections for united axial adjustment upon said drive shaft, with said third pulley section located between said connected half pulley sections, actuator means connecting said axially adjustable half pulley sections for positive axial adjustment upon said shaft, said actuator means being also axially adjustable with respect to said shaft, means mounting said third pulley section for axial adjustment upon said shaft, said pair of half pulley sections and the said third pulley section, together with said actuator means, being axially adjustable as a unit upon said shaft, a rotatable sleeve and a second shaft, said second shaft passing through said sleeve, and including a portion extending beyond one end of said sleeve, a second pair of V-section pulleys each composed of separate half pulley sections, means mounting the half pulley sections of one of said second pair of pulleys upon said extended portion of said second shaft in rotation driving relation to said second shaft and means mounting the half pulley sections of the other pulley of said second pair of pulleys upon said sleeve in rotation driving relation to said sleeve, one of the half pulley sections on said second shaft and sleeve being fixed against axial adjustment and the other half pulley section being axially adjustable, an endless trapezoidal section belt inter-connecting one of the pulleys on said drive shaft with the pulley on the extended portion of said second shaft, a second endless trapezoidal section belt inter-connecting the other pulley on said drive shaft with the pulley on said sleeve, actuator means connected with the said axially adjustable half pulley sections of said second pair of pulleys for positively adjusting said last mentioned half pulley sections with respect to their companion axially fixed pulley sections, and means inter-connecting the two said actuator means for adjusting the effective pitch diameters of the pulleys in inverse relationship with respect to the adjacent pulleys on the said drive shaft and on said sleeve and said second shaft.

References Cited in the file of this patent

UNITED STATES PATENTS

| | | |
|---|---|---|
| 1,015,481 | Draulette | Jan. 23, 1912 |
| 2,031,712 | Jannin | Feb. 25, 1936 |
| 2,151,189 | Coddington | Mar. 21, 1939 |
| 2,464,841 | Alexander | Mar. 22, 1949 |
| 2,476,353 | Booth | July 19, 1949 |

FOREIGN PATENTS

| | | |
|---|---|---|
| 162,378 | Great Britain | Apr. 27, 1921 |
| 495,853 | Great Britain | June 6, 1938 |